US005862690A

United States Patent [19]

Jancsek

[11] Patent Number: 5,862,690

[45] Date of Patent: Jan. 26, 1999

[54] LOW PROFILE HANDLE

[75] Inventor: John Joseph Jancsek, Blaine, Minn.

[73] Assignee: Hoffman Enclosures, Inc., Anoka, Minn.

[21] Appl. No.: 725,739

[22] Filed: Oct. 4, 1996

[51] Int. Cl.[6] .......... B60R 25/02

[52] U.S. Cl. .......... 70/224; 70/208; 252/336.3

[58] Field of Search .......... 70/207, 208, 224, 70/379 R, 368–371; 292/347, 348, 352, 336.3, DIG. 27, DIG. 31

[56] References Cited

U.S. PATENT DOCUMENTS

| | | | |
|---|---|---|---|
| D. 131,217 | 1/1942 | Braun . | |
| D. 197,050 | 12/1963 | Orenstein | D10/8 |
| D. 292,171 | 10/1987 | Berg | D8/331 |
| D. 332,904 | 2/1993 | Plummer et al. | D8/308 |
| D. 343,347 | 1/1994 | Lau et al. | D8/301 |
| 2,427,386 | 9/1947 | Claud-Mantle | 70/208 X |
| 2,570,160 | 10/1951 | Schoch | 70/208 |
| 4,510,779 | 4/1985 | Ahad | 70/208 |
| 4,631,937 | 12/1986 | Debus et al. | 70/207 |
| 5,211,044 | 5/1993 | Kim | 70/371 |
| 5,390,517 | 2/1995 | Yamada | 70/224 X |
| 5,408,853 | 4/1995 | Yamada | 70/224 |
| 5,452,596 | 9/1995 | Yamada | 70/208 |
| 5,664,448 | 9/1997 | Swan et al. | 70/224 |

FOREIGN PATENT DOCUMENTS

| | | | |
|---|---|---|---|
| 1266170 | 4/1968 | Germany | 70/224 |
| 3416151 | 11/1985 | Germany | 70/224 |
| 3840183 | 5/1990 | Germany | 70/224 |
| 2064633 | 6/1981 | United Kingdom | 70/224 |

*Primary Examiner*—Suzanne Dino Barrett
*Attorney, Agent, or Firm*—Merchant, Gould, Smith, Edell, Welter & Schmidt

[57] ABSTRACT

A low profile handle (20) includes a bezel (22) receiving a rotatable handle member (24). The handle member (24) includes an annular section (74) inserting with a bore through the bezel (22). The annular section includes a collar with recesses engaging tabs from a gear member seating to the end of the annular section. The gear (28) includes a recessed portion receiving the annular section to decrease overall height. A lock cylinder (26) inserts into the annular section and includes a cavity (110). A locking pin (30) slides within a channel formed in the handle and includes a peg (92) extending into the cavity (110). The rotation of the lock cylinder (26) retracts and extends the pin (30) into the cavity (66) formed in the bezel (22).

12 Claims, 7 Drawing Sheets

LOW PROFILE HANDLE

BACKGROUND OF THE INVENTION

1. Field of the Invention

The present invention is directed to rotatable handle apparatus and, in particular, to a low profile handle apparatus.

2. Prior Art

Handles for actuating quarter turn latches that are used in doors and enclosures are well known. Such handles are typically rotated one quarter turn to actuate and release a rotatable latch. In addition, latches often have a latching assembly that may be driven by gears to other remote retaining members for providing a secure closure. Such handles often include a lockable handle having a keyed lock cylinder for providing an additional level of security with the latch.

A common problem with prior latches is the height of the latch relative to the mounting surface. Prior latches require a substantial height and extend out from the surface of the enclosure to accommodate a handle. The handles may catch clothing and are typically less aesthetically pleasing than a flat streamlined design. The gear mechanism, which the handle must accommodate is often very complicated with many interacting parts which must be housed in the handle. The keyed cylinder must have a sufficient height for proper operation and should be kept close to the enclosure surface. The retaining structure required to retain a keyed lock cylinder as well as a handle member rotating relative to the bezel body while providing sufficient structural integrity requires additional depth. In addition, several supporting glide surfaces may be necessary to accommodate the various moving parts. The actuating assembly of a locking mechanism actuated by the lock cylinder requires additional parts and often, added height to the handle. Efforts to decrease the height of such handles are generally met with a weaker and less durable mechanism.

It can be seen then, that a new and improved quarter turn actuating handle is needed for enclosures. Such a handle should provide a low profile which extends a minimal amount from the enclosure mounting surface. In addition, the handle should include a bezel mounted to the enclosure which accepts a lock cylinder and associated actuating components. Such a device should also provide for limiting the rotation between the two positions of the lock cylinder and provide for actuating or preventing the actuation of the rotatable handle. Such a device should also be inexpensive, durable and easy to assemble. Moreover, the number of glide surfaces should be minimized. The present invention addresses these problems as well as others associated with quarter turn handles for enclosures.

SUMMARY OF THE INVENTION

The present invention is directed to a low profile handle and in particular, to a low profile handle used for actuating a latch system of an enclosure. The handle includes a mounting member or bezel with a handle rotating one quarter turn relative thereto. The handle member extends along the bezel in a streamlined low profile configuration.

The bezel includes a raised portion which is substantially flush with the upper surface of the handle member. The remaining portion of the bezel accommodates the handle and includes an orifice formed therethrough proximate the raised portion. The orifice includes a shoulder and a ridge which accommodate a washer and the handle member. The raised portion includes a recess for receiving a logo insert and a lens covering the logo insert.

The handle member includes a grip portion and a rotational end portion. The rotational end portion accommodates a lock cylinder and includes an annular portion extending around the lock cylinder. The annular portion includes a collar at the extended end of the annular extension. The collar extends radially outward and includes spaced apart recesses for receiving tabs of a gear member. The annular section also includes a groove extending around the periphery of the annular section for receiving a retainer clip and wave washer. In addition, a channel is formed on a lower portion of the rotational end portion of the handle member for receiving a locking pin. The channel extends substantially parallel to the longitudinal direction of the grip portion.

The lock cylinder includes a substantially cylindrical body having a recess formed in the side for engaging the locking pin. Spring type clips extend radially outward and extend and retract as a key is inserted into the cylinder.

A locking pin slides within the channel and includes a widened end section which extends into a cavity in the bezel and retracts to allow rotation. The locking pin includes a peg extending from one side of the locking pin and into the cavity formed in the lock cylinder. With this configuration, the locking pin directly engages the lock cylinder for simple direct actuation. The cavity in the lock cylinder which extends only partially around the periphery of the lock cylinder prevents further sliding of the locking pin, which limits rotation of the handle in an extended position.

A gear inserts within the underside of the bezel on top of the mounting surfaces and engages the annular section of the handle member. The gear includes radially outward extending teeth and an outer portion for blocking the rotation of the gear beyond a predetermined position. Extending axially upward from the gear are tabs which engage the recesses formed in the annular section of the handle member. The gear includes a recessed section within the tabs for receiving the annular section of the handle member. This telescoping interaction reduces the overall height required for the actuator assembly, thereby providing a lower profile.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference numerals and letters indicate corresponding structure throughout the several views.

DETAILED DESCRIPTION OF THE PREFERRED EMBODIMENT

Figure 1:
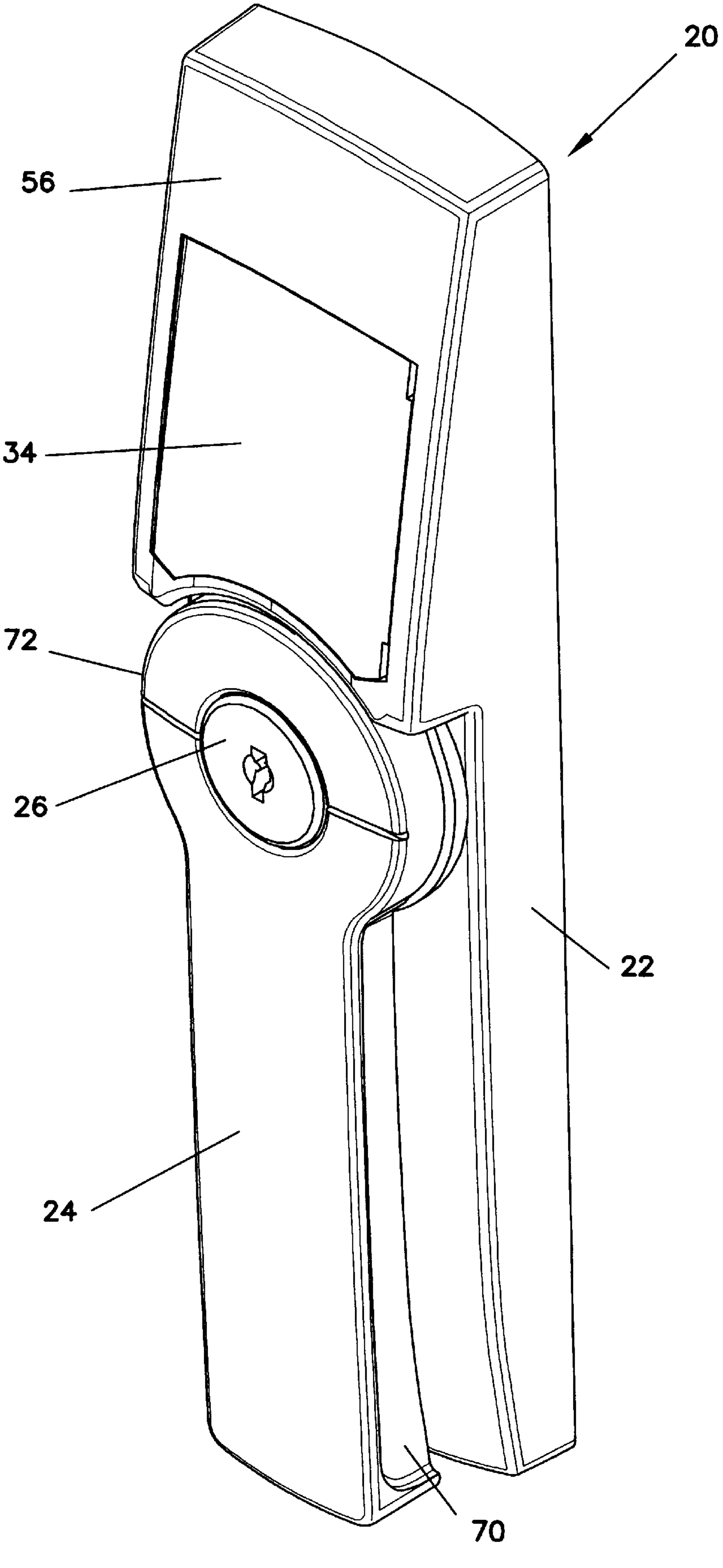
FIG. 1 shows a perspective view of a low profile handle according to the principles of the present invention.
Figure 2:
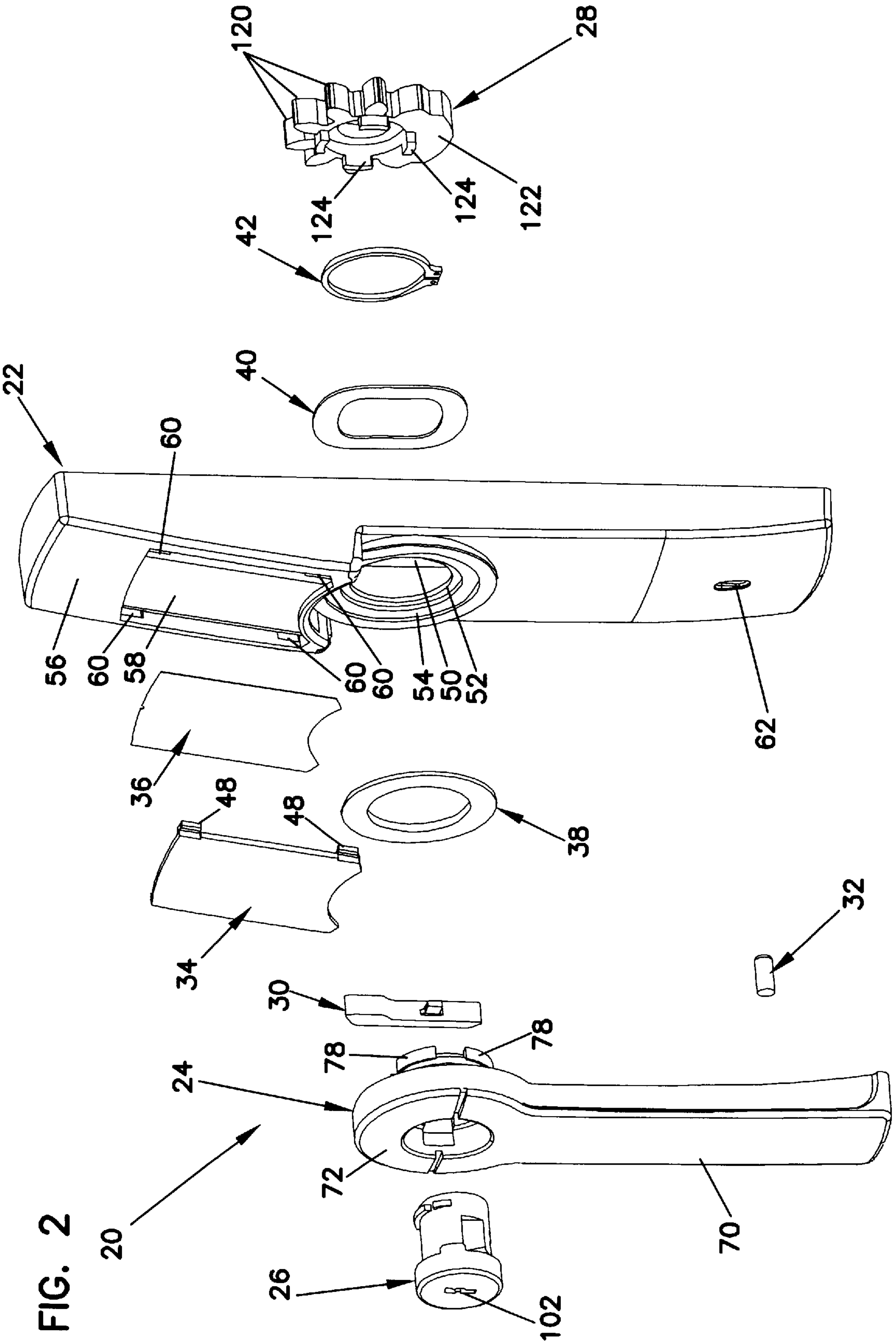
FIG. 2 shows an exploded perspective view of the low profile handle shown in FIG. 1.

Referring now to the drawings, and in particular to FIGS. 1 and 2, there is shown a low profile handle, generally designated 20. The handle 20 is utilized for actuating latches of enclosures. The low profile handle 20 includes a mounting body, often referred to as a bezel, 22 and a handle member 24 rotating relative thereto. The handle member 24 is coaxially aligned with a lock cylinder 26 and a gear 28 for actuating the latch of the enclosure. Latch systems typically require one quarter turn of the handle number 24 to actuate the latch system.

As shown in FIG. 2, the bezel 22 includes a raised portion 56 receiving a logo insert 36 covered by a lens 34. This configuration allows the designation of the handle 20 to be the manufacturer, the enclosure maker or the customer receiving the enclosure. In addition, other instructions or identification may be placed on the insert 36. The raised portion 56 is substantially flush with the upper surface of the handle member 24 providing a streamlined profile as shown in FIG. 1. The raised portion 56 includes an arcing upward extending surface proximate the rounded portion of the handle member 24. A recess 62 is formed at an extended end of the lower portion of the bezel 22 to engage a detent post 32 attached to the handle 24 for maintaining the handle in an aligned unactuated position. The bezel 22 further includes an orifice formed therethrough proximate the raised portion 56. A shoulder 52 having a ridge 54 extends around the outer edge of the orifice. The orifice and shoulder 52 receive the lock cylinder 26, handle 24, and other components, as explained hereinafter. The raised portion 56 includes a recess 58 and slots 60 configured for receiving the lens cover 34 and lens retainer tabs 48. The low profile handle 20 accommodates the lock cylinder 26 extending through the orifice of the handle member 24 and the bezel 22. In addition, a locking pin 30 slides upon actuation of the lock cylinder 26 to lock and unlock the handle 20. A washer 38 seats in the depression formed by the shoulder 52 in the orifice 50. A spring type wave washer 40 and a retaining clip 42 retain the lock cylinder handle 24 in position. The gear 28 inserts under the bezel 22 on the mounting surface to engage the handle 24, as explained hereinafter.

Figure 6:
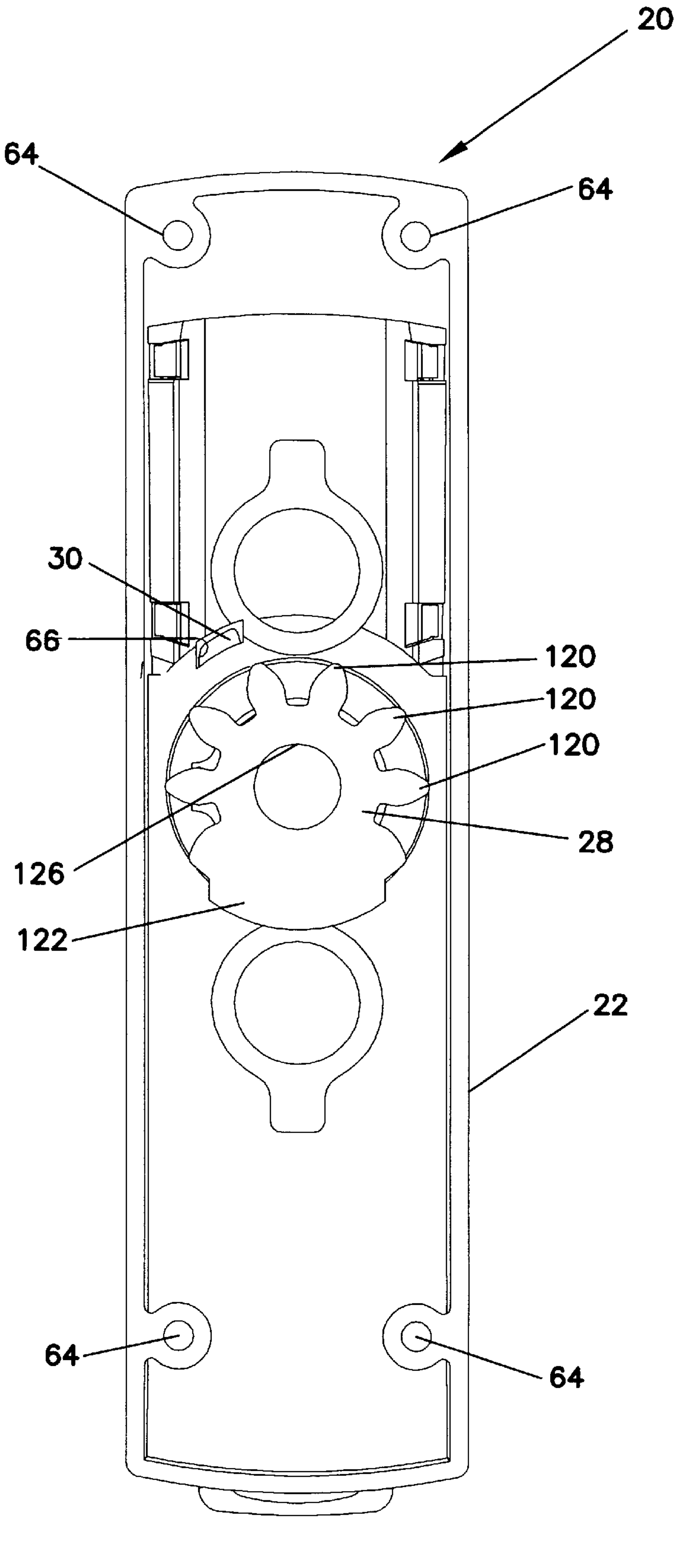
FIG. 6 shows a rear elevational view of the low profile handle shown in FIG. 1.

Referring to FIG. 6, the rear of the low profile handle 20 includes mounting holes 64 for receiving mounting hardware spaced apart at ends of the bezel 22. The mounting holes 64 are spaced equidistant from the rotational axis of the handle 24, lock cylinder 26 and gear 28. With this configuration, the handle 20 may be reversed and mounted in different configurations without requiring additional differently configured bezels 22.

Figure 7:
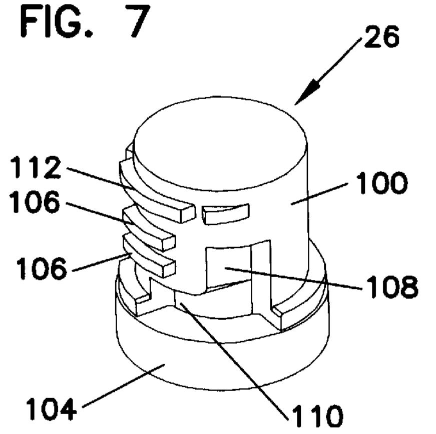
FIG. 7 shows a perspective view of the lock cylinder for the low profile handle shown in FIG. 1.

Referring now to FIG. 7, the lock cylinder 26 includes a cylindrical body 100 with an upper outward extending rim portion 104. The cylindrical body 100 has a key receiving slot 102, shown in FIG. 3, formed in an upper surface thereof for actuation by a key having a distinctive tooth pattern. Spring clips 106 retract and expand radially as the key is inserted to allow rotation of the lock cylinder when actuated with the key. Spring clips 106 extend and retract radially when the key is inserted into a proper position. Spring clip 112 expands and retracts under pressure and is retracted only during assembly. When the lock cylinder 26 is inserted into the handle 24, the spring clip 112 is retracted. When the lock cylinder 26 is fully inserted, the spring clip 112 expands radially and retains the lock cylinder 26 in the handle 24. The lock cylinder 26 of the present invention also includes recesses for direct actuation. A recess 108 is formed in the side of the cylinder and has an expanded angularly extending recess portion 110 at the upper portion of recess 108 for engaging a peg portion of the locking pin, as explained hereinafter.

Figure 8:
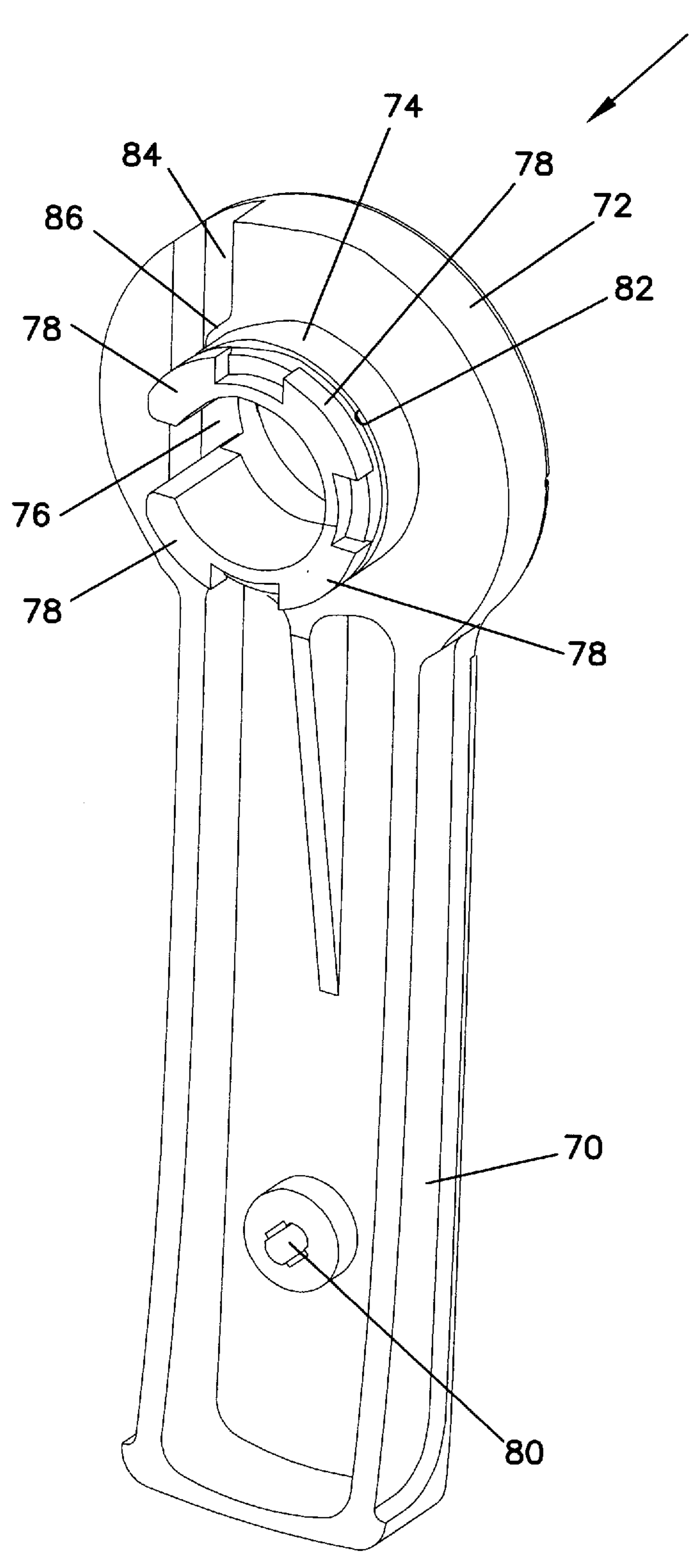
FIG. 8 shows a rear perspective view of the handle member for the low profile handle shown in FIG. 1.

As shown in FIG. 8, the handle member 24 includes a grip portion 70 extending from a lock assembly receiving portion 72. The lock assembly receiving portion 72 is rounded and rotates along the arcing edge of the raised portion 56 of the bezel 22. The grip portion 70 includes a post holding section 80 for retaining the detent post 32 and maintaining the handle 24 in the home position on the bezel 22. The lock assembly receiving portion 72 includes an annular section 74 extended outward axially from the lock assembly receiving portion 72. The annular section 74 forms an orifice extending through the lock assembly receiving portion 72. The annular section 74 includes an open side 76 receiving a peg portion of the pin 30, as explained hereinafter. The annular section 74 has collar portions 78 extending radially outward and having recesses formed therein and spaced apart for receiving tabs of the gear 28, as explained hereinafter. The lock assembly receiving portion 72 has a channel 84 formed therein extending substantially parallel to the grip portion 70 with a finger 86 extending partially into the channel 84.

Figure 9:
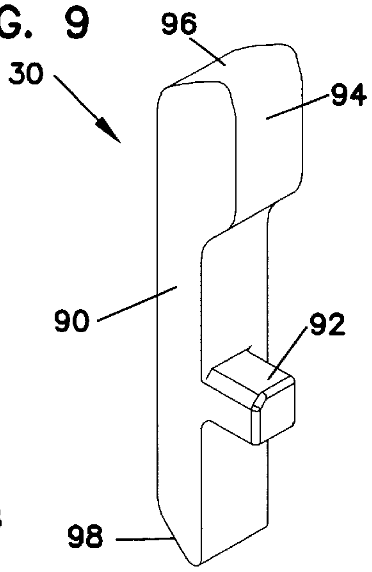
FIG. 9 shows a perspective view of the locking pin for the low profile handle shown in FIG. 1; and, FIG. 10 shows a perspective view of the gear for the low profile handle shown in FIG. 1.

Referring now to FIG. 9, there is shown the sliding locking pin 30. The locking pin 30 includes an elongated body 90 having a widened head portion 94 at one end of the body 90. The peg 92 engages the cavity 110 in the lock cylinder 26 and the open side 76 of the annular section of the grip member, as explained hereinafter. The widened head 94 prevents shearing and slides into and out of engagement with a cavity in the bezel 22, as explained hereinafter. The head 94 includes an angled end portion 96 while the other end of the body 90 includes an angled portion 98 substantially following the periphery of the lock receiving portion 72, providing for rotation of the grip member.

Figure 10:
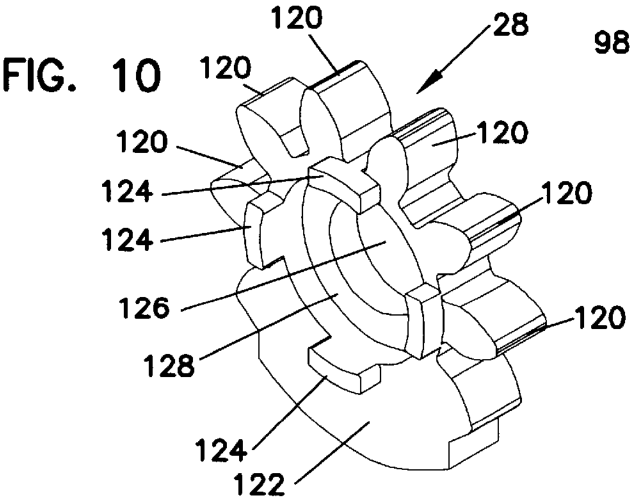

Referring to FIG. 10, the gear 28 includes a plurality of teeth 120 extending around a portion of the periphery of the gear 28. A widened peripheral section 122 prevents rotation beyond a predetermined point and limits rotation of the handle member 24. The gear 28 includes an orifice 126 formed therethrough with a gear shoulder 128 extending around the periphery of the orifice 126. Four tabs 124 extend upward from the surface of the gear 28 around the orifice 126 and the gear shoulder 128 to engage the handle member 24, as explained hereinafter.

Figure 3:
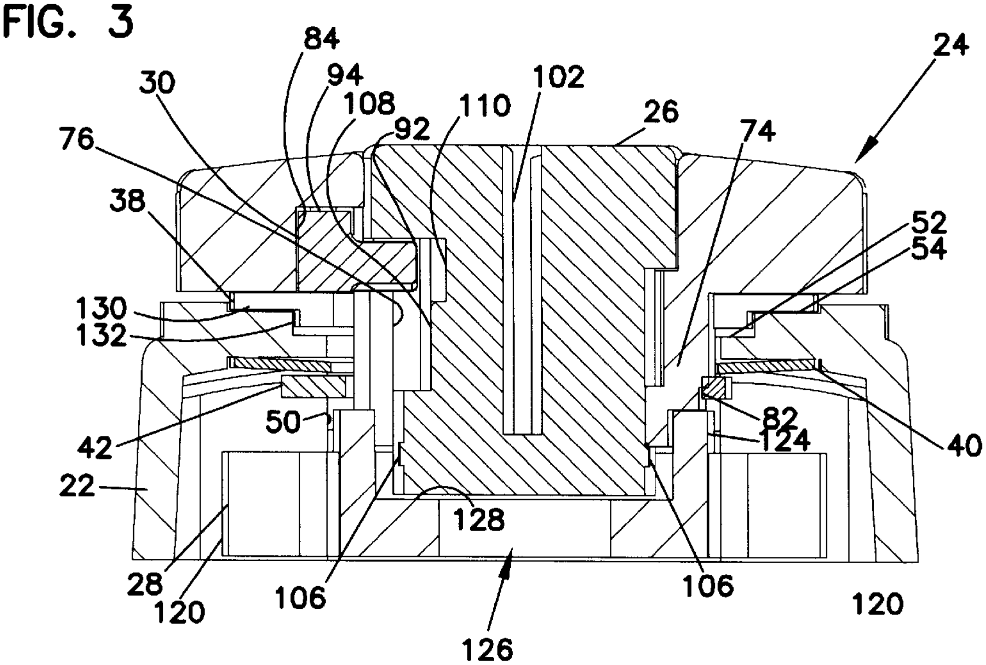
FIG. 3 shows a sectional view taken along line 3—3 through the locking assembly of the low profile handle shown in FIG. 1.

Referring to FIG. 3, the interaction of the lock assembly and the various elements can be more clearly illustrated. It can be appreciated that the washer 38 includes an upper widened portion 130 and a smaller lower section 132. The washer 38 sets against the shoulder 52 and the ridge 54 surrounding the orifice 50. It can be appreciated that the washer 38 provides a sliding surface for the handle member 24 on the bezel 22. In addition, the pin 30 slides on the upper surface of the washer 38. It can also be appreciated that the peg 92 of the locking pin 30 extends into the cavity 110 in the lock cylinder 26.

The spring clip 42 and the spring-type washer 40 insert around the lock cylinder 26 and fit in annular groove 82 formed in the annular section 74 of the handle member 24. It can also be appreciated that the lock cylinder 26 and annular section 74 of the handle member 24 insert in the recess formed within the orifice 126 and the tabs 124 of the gear 28. Such a telescopic type fit and layered interaction reduces the overall height of the handle 20, thereby maintaining a lower profile. The bezel 22 includes open space between the bezel body and the mounting surface to accommodate the teeth 120 of the gear 28 and maintain a lower profile.

Figure 4:
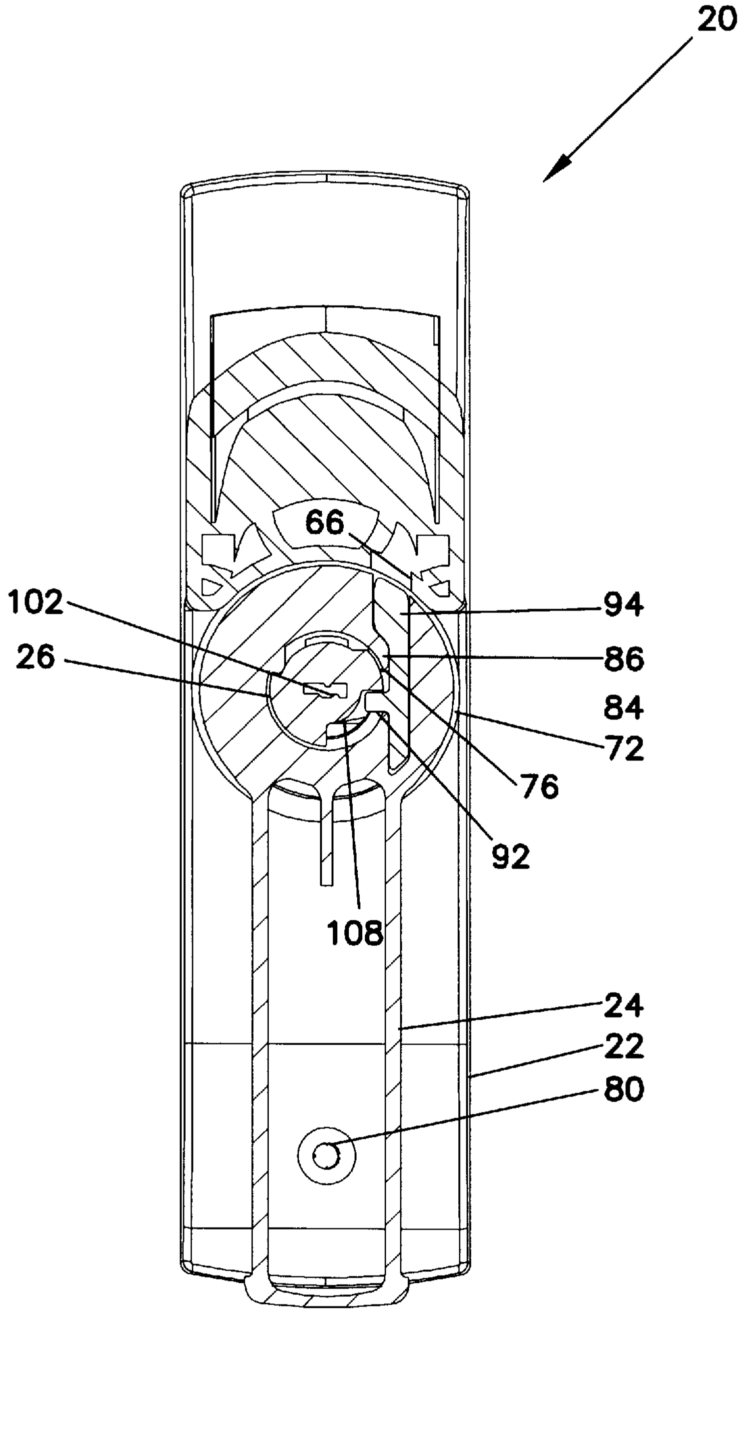
FIG. 4 shows a sectional view taken along line 4—4 through the locking assembly of the low profile handle shown in FIG. 1 in an unlocked position.
Figure 5:
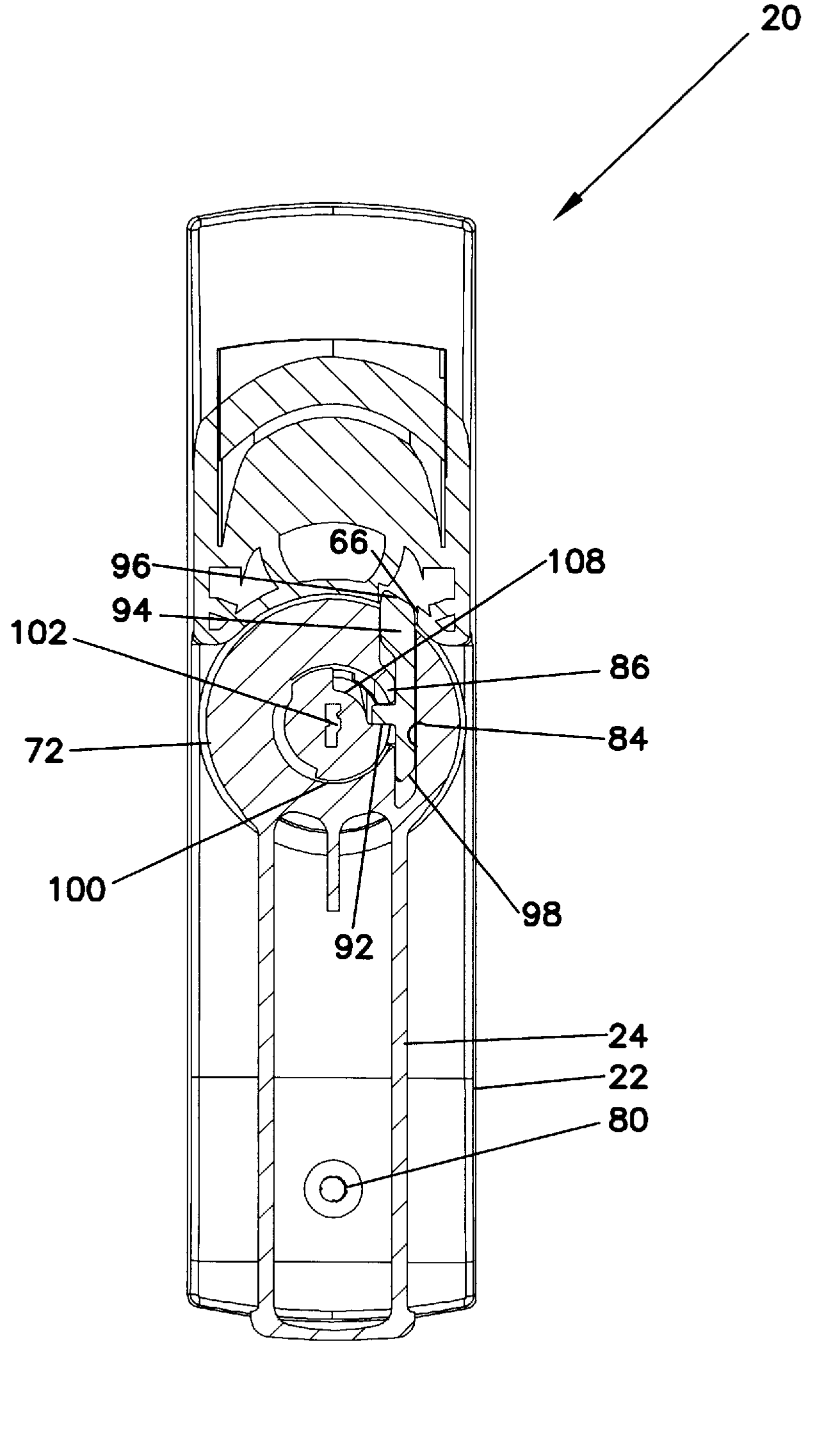
FIG. 5 shows a sectional view taken along line 4—4 through the locking assembly of the low profile handle shown in FIG. 1 in a locked position.

The locking and rotation limiting assembly and operation is more clearly illustrated in FIGS. 4 and 5. It can be appreciated that in the unlocked position shown in FIG. 4, the locking pin 30 is retracted and rotates within the outer radius of the outer periphery of the lock assembly receiving portion 72 of the handle member 24. However, in the locked position of FIG. 5, the locking pin 30 is slid forward into a cavity 66 formed in the bezel 22 to prevent rotation of the handle member 24. In the unlocked retracted position shown in FIG. 4, the lock cylinder 26 is rotated so that the cavity 110 shown in FIG. 7 formed in the side wall thereof receives the peg 92 of the locking pin 30. The end of the most counter clockwise end of the cavity 110 engages the peg 92 and slides the locking pin 30 to its fully retracted position. However, when the key is inserted into the slot 102 and the lock cylinder 26 can be rotated, the most clockwise end of the annular cavity 110 pushes against the peg 92 and slides the locking pin 30 upward as shown in FIGS. 4 and 5 until the widened head portion 94 extends into the cavity 66 formed in the bezel 22. It is appreciated that the angled end portions 96 and 98 allow for rotation with a smaller length locking pin 30. In addition, the widened end portion 94 prevents sheer should a user attempt to rotate the handle 24 when the locking pin 30 is slid into the locked position shown in FIG. 5. It is appreciated that the configuration of the locking pin 30 provides for a simple easily actuated locking device which is directly actuated by the lock cylinder 26.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A handle apparatus, comprising:

a mounting body having an upper surface defining a recess;

a grip member rotatably attached to the mounting body and having a bore extending therethrough and a channel extending substantially transversely to the bore and tangent the bore;

a lock cylinder rotatably mounted in the grip member bore, the lock cylinder defining a cavity formed along an outer side wall;

a retainer member slidably mounted in the channel having a peg portion extending into the cavity of the lock cylinder and an end portion sliding transversely to the bore into and out of the recess of the mounting body wherein the lock cylinder engages the peg portion, and wherein rotation of the lock cylinder retracts the retainer member to a position within the grip member.

2. The handle apparatus according to claim 1, further comprising a washer mounting in the recess and wherein the grip member rotatably slides on the washer and the retainer member slides on the washer.

3. The handle apparatus according to claim 1, wherein the grip member includes a finger portion extending into the channel so that the finger portion engages the peg when the retainer member is extended.

4. A handle apparatus according to claim 1, wherein the end portion of the retainer member includes an end surface extending at an oblique angle to a longitudinal portion of the retainer member.

5. A handle apparatus according to claim 1, wherein the end portion of the retainer member includes a widened section.

6. A handle according to claim 1, wherein the retainer member end portion is angled and an opposite end is angled.

7. A handle apparatus, comprising:

an elongated mounting member having a bore extending therethrough transverse to a longitudinal plane of the mounting member;

an elongated grip member rotatably mounted to the mounting member, the grip member having an annular portion extending transverse to a longitudinal plane of the grip member and inserting into the bore, the annular portion having radially outward extending collar portions spaced around an extended end of the annular portion forming spaced apart recesses;

a lock cylinder mounting the annular portion of the grip member;

a gear member having a plurality of outward extending teeth and a cavity extending transverse and radially inward from the teeth and a plurality of tabs extending transverse to the teeth in spaced apart relation around a periphery of a cavity configured to extend into the recesses of the grip member.

8. A handle apparatus according to claim 7, further comprising a groove formed in a periphery of the annular portion.

9. A handle apparatus according to claim 8, further comprising an annular clip member engaging the groove of the annular section.

10. A handle apparatus according to claim 9, further comprising a wave washer extending around the annular portion intermediate the annular clip and the mounting member.

11. A handle apparatus according to claim 10, wherein the mounting member includes a raised portion having an arcing edge extending proximate the bore.

12. A handle apparatus, comprising:

a mounting body having an upper surface defining a recess;

a grip member rotatably attached to the mounting body and having a bore extending therethrough and a channel extending substantially transversely to the bore and tangent the bore;

a lock cylinder rotatably mounted in the grip member bore, the lock cylinder defining a cavity formed along an outer side wall;

a retainer member slidably mounted in the channel having a peg portion extending into the cavity of the lock cylinder and an end portion sliding transversely to the bore into and out of the recess of the mounting body, wherein the retainer member end portion is widened and wherein the channel includes a finger portion extending therein, whereby upon retraction of the retainer member, the widened end portion engages the finger portion.

* * * * *